Feb. 11, 1964   B. E. BERLINGER, JR., ETAL   3,120,764
GEAR ASSEMBLY
Filed Feb. 28, 1962   3 Sheets-Sheet 1

INVENTORS:
BERNARD E. BERLINGER, JR.
BY HARRY E. SULZER
Howson & Howson
ATTYS.

Feb. 11, 1964 B. E. BERLINGER, JR., ETAL 3,120,764
GEAR ASSEMBLY
Filed Feb. 28, 1962 3 Sheets-Sheet 2

INVENTORS:
BERNARD E. BERLINGER, JR.
HARRY E. SULZER
BY Howson & Howson
ATTYS.

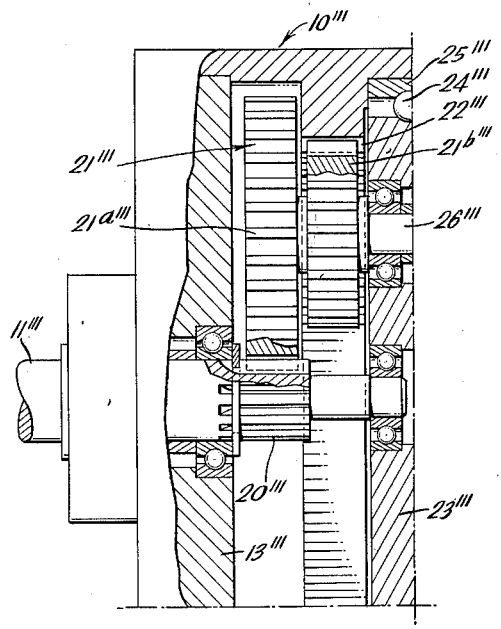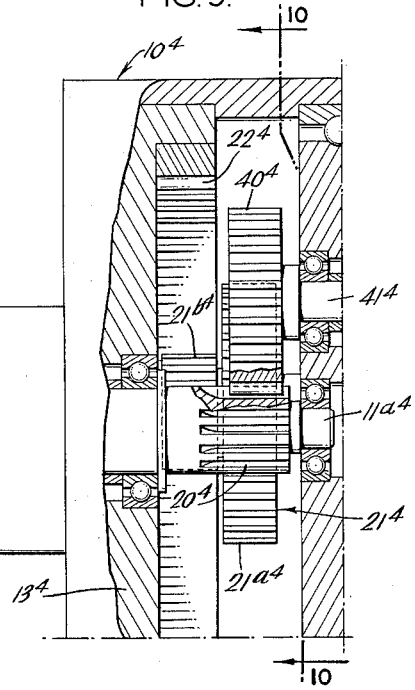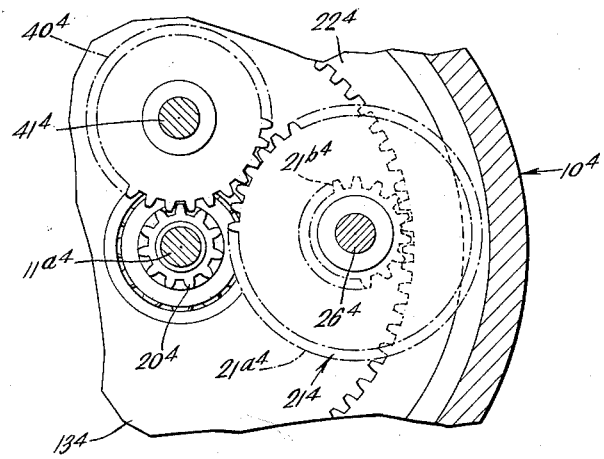
INVENTORS.
BERNARD E. BERLINGER, JR.
HARRY E. SULZER United States Patent Office 3,120,764
Patented Feb. 11, 1964

3,120,764
GEAR ASSEMBLY
Bernard E. Berlinger, Jr., Carversville, and Harry E. Sulzer, Trevose, Pa., assignors to Quaker City Gear Works Inc., Bethayres, Pa., a corporation of Pennsylvania
Filed Feb. 28, 1962, Ser. No. 176,360
19 Claims. (Cl. 74—801)

The present invention relates to a highly simplified gear assembly which is capable of achieving essentially any desired ratio of input to output rate of rotation in a more compact structure.

In the prior art so-called "gear reduction units" have been relatively complex devices of principally two types. One type has employed a plurality of parallel rotatable shafts, each bearing a large and a small gear such that the small gear on a particular shaft meshes with the large gear of the previous shaft and the large gear on that shaft meshes with the small gear on the next successive shaft. Another type has been a multistage repeated planetary structure in which the input of each stage is a sun pinion meshing with at least one planetary gear which is rotatably supported on a spider; the planetary gear meshes with a fixed ring gear so that its rotation necessitates rotation of the spider; the spider in turn carries the sun pinion for the next stage, etc.

It will be apparent from the nature of these conventional arrangements that the larger the reduction to be obtained, the larger and more complicated the gearing required. Moreover, prior art arrangements produced complicated and tedious assembly problems as well as complicated design problems in order to design and build gear reduction units having different ratios.

The present invention involves an assembly which is materially simpler than that of the prior art and which employs as few as six gears to achieve any desired ratio, including many ratios in the order of hundreds of thousands or millions to one. In the past such ratios have been achieved only by stacking of stages, usually using multiple complete gear assemblies in tandem.

The present invention employs a planetary gear structure to drive the spider essentially like one of the prior art systems. The planetary gear system according to the present invention ordinarily employs a pinion sun gear and a ring gear fixed with respect to the frame or housing of the assembly. The planetary gear is rotatably supported on the spider member between the ring and sun gear so that rotation of the sun gear produces revolution of the planetary around the sun gear. This happens because the ring gear is fixed and hence relative movement of the ring and planetary gears drives the spider rotatably.

In a preferred embodiment there is direct meshing between the sun and planetary gears and the planetary gear is connected through the spider to a gear on the output side of the spider by a common shaft with the planetary gear. The gear on the output side is then connected through an intermediate gear to the output pinion on the output shaft and works a reversal of the direction of rotation of the output shaft. The output shaft, however, is simultaneously driven forward by the action of rotation of the spider, and, therefore, it is the difference between the rotation tending to drive the output forward and the rotation tending to drive the output in reverse which determines the speed of the output shaft. By choice of gear ratios this speed may be made an extremely small ratio of input speed.

Other variations of the invention cause reversal by an intermediate gear otherwise located. For example, it is possible to locate the intermediate gear between the input sun pinion and the planetary gear. Then the gear on the output side is connected to the same shaft as the intermediate gear instead of the planetary gear. The gear on the output side in this instance meshes directly with the output pinion on the output shaft.

By virtue of the assembly described a very much simpler gear reduction assembly, and therefore much smaller assembly, can be provided than was known heretofore. This results in savings in the cost of manufacture both in the cost of making parts and in the assembly thereof. It also makes for a much more precise and accurate gear assembly than was heretofore possible and permits the obtaining of gear ratios not heretofore possible by systems of comparative small size in the prior art.

The gear assembly also makes possible a very simple method of assembly which involves first assembling the gears on the spider including selecting the position and size of the gears then placing the spider in the supporting frame which is preferably a tubular housing including the ring gear and finally putting in place the end plates which support the input and output shafts.

For a better understanding of the present invention reference is made to the following drawings in which:

FIG. 8 is a sectional view similar to that of FIG. 1 showing a modified embodiment of the present invention;

FIG. 9 is a sectional view similar to that of FIG. 4 showing a modified embodiment of the present invention; and FIG. 10 is a sectional view taken along line 10—10 of FIG. 9.

Figure 1:
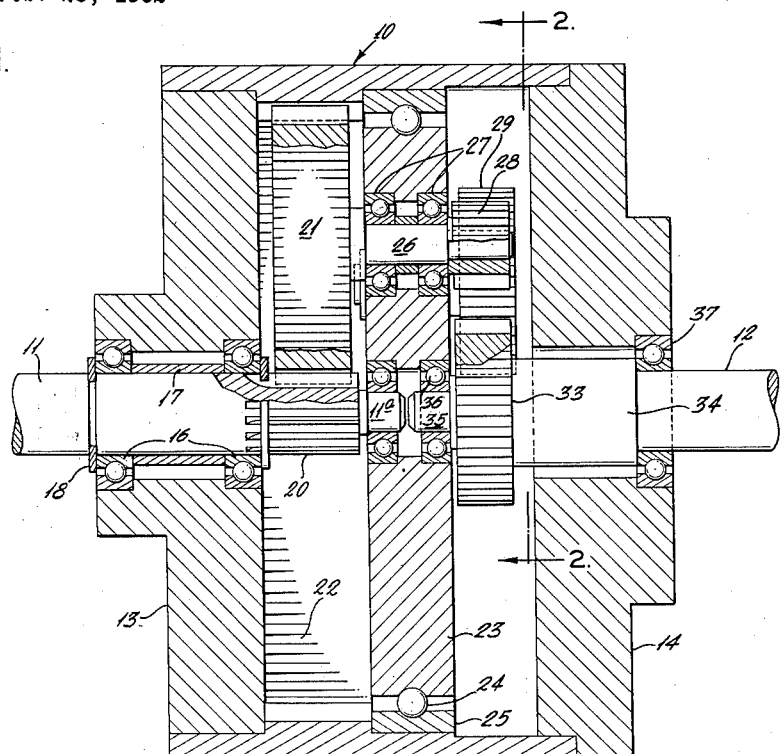
FIG. 1 is an axial sectional view of a preferred embodiment of the gear assembly in accordance with the present invention.

Referring to FIG. 1 it will be observed that here the supporting frame for containing the assembly consists of a housing generally designated 10 into one side of which enters the input shaft 11 and from the other side of which leaves the output shaft 12. End plates 13 and 14 provide bearing support for the shafts 11 and 12, respectively, and close the ends of the housing provided by the tubular frame member 15.

Input shaft 11 is supported on a pair of roller bearings 16 which are preferably ball bearings, as shown. The outer races of these ball bearings are press fitted into the end plate 13 and the inner races are held in place along shaft 11 separated by tubular separator 17 and held in proper position by snap rings 18. The reduced end 11a of the shaft 11 is received in a roller bearing assembly press fitted into the spider 23, described below. Within the housing, which is preferably closed to protect the gears from dust and dirt particles, is the driving sun gear 20, which preferably is a pinion formed directly on the end of the shaft 11. This sun gear meshes with and drives at least one planetary gear 21 which preferably is a spur gear meshing also with a ring gear 22 formed in the side walls of the tubular section 15 of the housing. Also rotatably supported on the tubular housing 15 by rolling bearing 24, preferably conventional ball bearing, is the spider member 23 which preferably has an outer bearing race press-fitted into the housing. The inner race of bearing 25 may be press-fitted onto the outer edge of the spider or, as represented in FIG. 1, it may be integral with the spider providing a groove formed in the outer edge thereof.

The spider provides support for planetary gear 21 through shaft 26 which is supported in ball bearings 27. Again the outer races of these bearings are press-fitted into the spider and the inner races are held in place separated by a tubular separator between said shoulders on shaft 26. The shaft is successively reduced in diameter and a shoulder at the reduced diameter end may be provided by a snap ring or other suitable means. Also fixed to the reduced diameter end is a suitable spur gear 28 of selected size, possibly different from planet gear 21, but driven at the same rotational speed as the planet gear.

Figure 2:
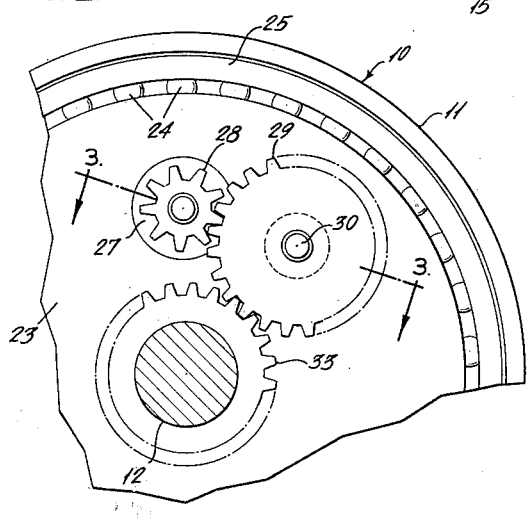
FIG. 2 is a sectional view taken along line 2—2 of FIG. 1.
Figure 3:
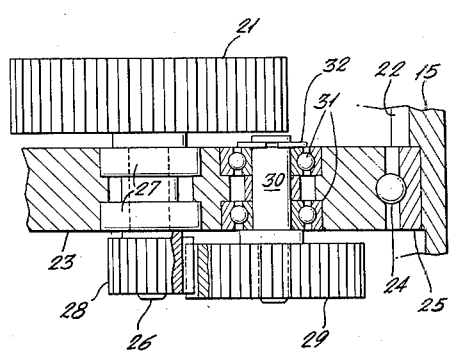
FIG. 3 is a sectional view taken along line 3—3 of FIG. 2.

As best seen in FIGS. 2 and 3 gear 28 meshes with intermediate gear 29 also preferably a spur gear which is rotatably supported on shaft 30. Spur gear 29 may be a compound or cluster gear having gears of two different diameters fixed on a single shaft, one gear meshing with gear 28 and the other with gear 33 on the output shaft. Shaft 30 is a stud shaft supported in ball bearings 31 similar to those employed for shaft 26, the inner races of which, and their separator, are held in place between a shoulder on the shaft and snap ring 32, or the equivalent. Intermediate gear 29 also meshes with the output gear 33 fixed to output shaft 12 adjacent an enlarged diameter portion 34. The much reduced diameter end portion 35 of shaft 12 is adapted to slip within the bearing assembly 36 an inner race of which is press-fitted into an axial opening in the spider 23. Further bearing support is provided by the output plate 14 through rolling bearing 37 whose inner and outer races are press-fitted to the end plate 14 and the shaft 12, respectively.

It will be observed that the structure described is very simple in construction relative to the prior art structure described above. As a practical matter, the gears rotatably supported on the spider may be assembled in place prior to assembling the spider in place on the frame or within the housing. Thereafter the end plates 13 and 14 with the shafts 11 and 12, respectively, in place may be press-fitted into engagement with the tubular housing portion 15. As the end plates are put in position the pinion 20 will mesh with planet gear 21 and the spur gear 33 will mesh with intermediate gear 29. The ends of shafts 11 and 12 will slip within the inner race of axial bearings already assembled in the spider and thereby be supported against radial displacement. The gears, it will be observed, may be standard gears and are supported on short shafts. The spider is positively supported at its periphery by the rolling bearings and the input and output shafts are preferably well supported each on at least a pair of bearings one on the end plate and one on the spider.

It will be observed that in operation as the input shaft 11 causes gear 20 to rotate, planet gear 21 will be caused to rotate and hence driven around ring gear 22. This will produce rotational movement of the spider 23 as it follows the rotation of the planet gear. Moreover the spur gear 28 is driven in synchronism with the planet gear 21 by virtue of mounting on the same shaft. Gear 28 if directly meshed with gear 33 would drive that gear forward so that the shaft 12 would rotate in the same direction as the shaft 11 under the driving effect of that gear. However, by the introduction of intermediate gear 29 the direction of rotation is reversed. At the same time, however, the movement of the spider produces a movement in the opposite direction and it is the difference between these directions of movement which produces the ultimate rate of output of the shaft 12, which determines ratio of rotational speeds at the input and output shafts. It will be observed that from the standpoint of obtaining a standard assembly it is desirable to make the input pinion, ring gear and planet gear of standard sizes. The changes in gear ratio are then achieved through gears 28, 29 and 33.

It will be appreciated by those skilled in the art that the output torque capabilities of the systems described may be increased by the use of multiple planetary gears, connected through multiple gears on the output side of the spider and multiple intermediate gears. Corresponding duplication in other systems, as in this, will multiply torque capabilities approximately by the number of planetary gears employed.

Figure 4:
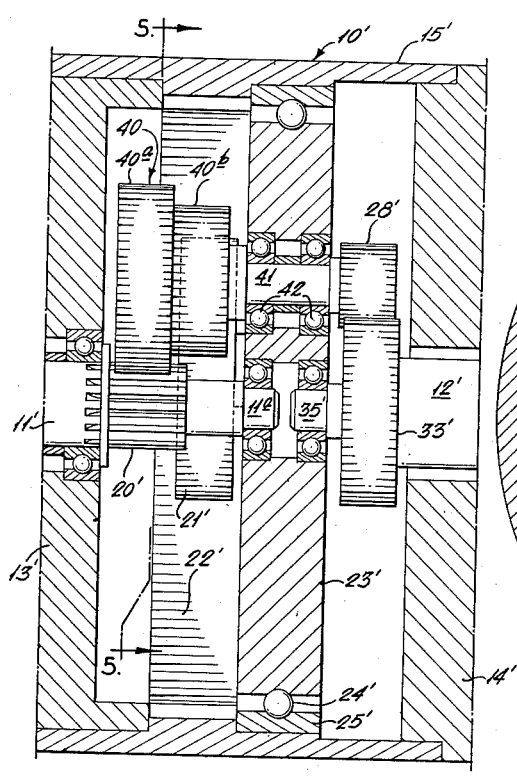
FIG. 4 is a sectional view similar to that of FIG. 1 showing a modified embodiment of the present invention.
Figure 5:
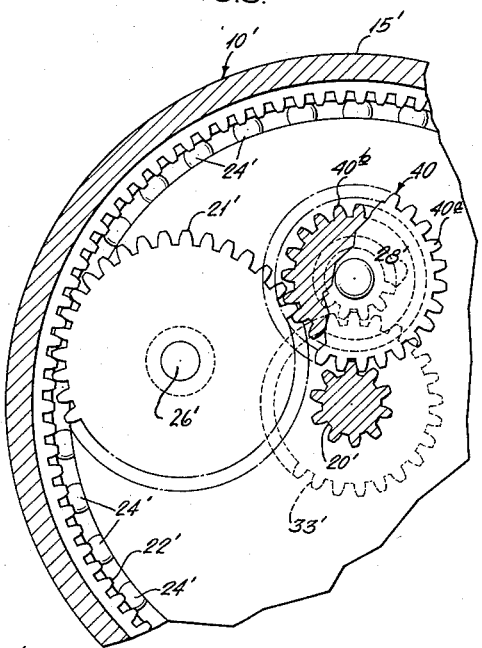
FIG. 5 is a sectional view taken along line 5—5 of FIG. 4.

Other capabilities of the structure in accordance with the present invention can be realized through modifications such as that shown in FIGS. 4 and 5. In this modification parts similar to those in the structure of FIGS. 1–3 are identified by the same number designator with the addition of primes thereto. The primary difference lies in the use of an intermediate gear on the input side rather than on the output side of the structure. The intermediate gear 40 in this case is a cluster gear having a larger diameter portion 40a meshing with the input pinion 20' and a smaller diameter portion 40b meshing with the planetary gear 21. The planetary gear is rotatably supported on the spider 23' by shaft 26' and meshes with the ring gear 22' on the housing 15'. In this case, however, the shaft 26' does not extend through the spider to a gear on the other side but instead the shaft 41 of the intermediate gear 40 suitably supported in bearing 42 extends through the spider 23' and is fixed to spur gear 28'. Here spur gear 28' meshes with the output gear 33' without the use of an intermediate gear.

The location of the intermediate gear 40 between the input pinion 20' and the planetary gear 21' not only serves to couple these two gears together but to effectively reverse the rotation at the output gear 33' and its output shaft 12' from the direction of rotation imposed by the spider 23' through gear 28'. Thus, in effect, gear 40' accomplishes the same end as intermediate gear 29 in the structure of FIGS. 1–3. The structure, however, being considered different.

Figure 6:
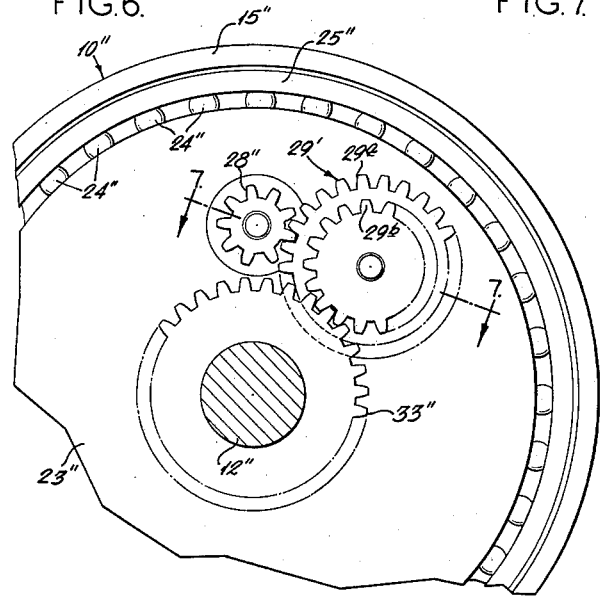
FIG. 6 is a sectional view similar to that of FIG. 2 in which a cluster gear has been substituted for the simple intermediate spur gear.
Figure 7:
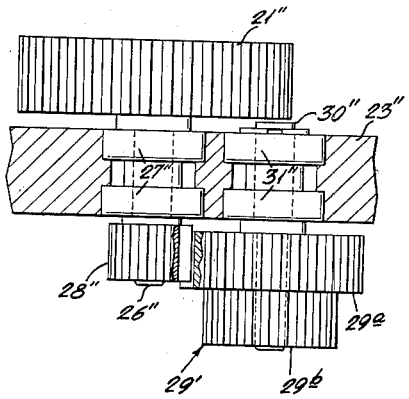
FIG. 7 is a sectional view taken along line 7—7 of FIG. 6.

The use of cluster gears is by no means confined to an arrangement such as that shown in FIGS. 4 and 5. The cluster gears may be used as any coupling gear which meshes with two other gears which it effectively ties together. Thus, in FIGS. 6 and 7 a structure essentially like that of FIGS. 1–3 is shown except that a cluster gear 29' is substituted for the simple gear 29. As seen in FIGS. 6 and 7, parts corresponding to those in the structure of FIGS. 1–3 are designated by similar number designators with the addition of double primes thereto except in the case of intermediate gear 29'. In addition to serving the same intermediate gear functions served by gear 29 cluster gear 29' permits ratio change at the intermediate gear, as well. It will be seen that in this case since gear 28' is quite small with respect to larger diameter portion 29a of cluster gear 29' with which it meshes the result will be effectively a decrease in speed and a further decrease is accomplished through the use of smaller diameter portion 29b which meshes with larger output gear 33'. In other respects the structure and operation of the device of FIGS. 6 and 7 is the same as that of the structure of FIGS. 1–3.

A cluster gear may also be used at the input in the position of the intermediate gear 40 in FIGS. 4 and 5 but support by a stud shaft and the arrangement in other respects like that of FIGS. 1–3, i.e., the planetary gear connected through the spider by a common shaft to a gear on the output side. Such an arrangement would reverse the direction of rotation at the output, of course, but would in no way change the principle of operation. Where extremely great ratios are required a cluster gear between the input and planetary gears and another cluster gear for the intermediate gears as in FIGS. 6 and 7 may be employed.

The planet gear illustrated in FIG. 1 may be in the form of a cluster gear in other embodiments of the present invention, as shown in FIG. 8, wherein parts similar to those in the structure of FIG. 1, as shown in FIG. 8, are identified by the same numeral designator with the addition of triple primes thereto. The planet gear 21''', in FIG. 8, is a cluster gear having a larger diameter portion 21a''' meshing with the input pinion 20''' and a smaller diameter portion 21b''' meshing with the ring gear 22'''. In this embodiment the ring gear 22''' has been made narrower than in FIG. 1 and a portion of the housing 10''' cut away in order that the larger portion of the planet gear would not strike the housing or ring gear. This embodiment cooperates in the same manner as described in regard to FIG. 1 with the exception that a further gear reduction is accomplished by having the planet gear 21''' in the form of a cluster gear.

The planet gear illustrated in FIG. 4 may be in the form of a cluster gear, as shown in FIGS. 9 and 10, wherein parts similar to those in FIG. 4 are identified by the same numeral designator with the addition of exponents to the fourth power thereto. As shown in FIGS. 9 and 10, the planet gear $21^4$ is a cluster gear having a larger diameter portion $21a^4$ meshing with the intermediate gear $40^4$ driven by the sun gear $20^4$ and a smaller diameter portion $21b^4$ meshing with the ring gear $22^4$. In FIG. 9 it can be seen that the ring gear $22^4$ has been made narrower than shown in FIG. 4 and a portion of the housing $10^4$ cut away to permit rotation of the larger portion of the planet gear without striking the housing or ring gear. By this arrangement, as compared to the assembly in FIG. 4, with the planet gear as a cluster gear instead of the intermediate gear, the further gear reduction is provided by the planet gear and the same reversal of the direction of rotation of the output gear from the direction of rotation of the spider is accomplished. The remainder of the assembly in FIG. 9 cooperates in the same manner as described in regard to FIG. 4.

Several modifications of the present invention have been illustrated. It will be appreciated that other modifications will occur to those skilled in the art. No limitation is implied by the structures shown which are intended to be by way of illustration rather than by limitation. For example, it will be obvious to those skilled in the art that what has been called the input shaft could in another instance be the output shaft and vice versa. All such modifications within the scope of the claims are intended to be within the scope and spirit of the present invention.

We claim:

1. A gear assembly comprising a supporting frame for containing the assembly, a spider assembly rotatably supported by the frame and dividing the structure into input and output sides, a ring gear supported by and fixed to the frame on the input side of the spider coaxial with the axis of spider rotation, a planetary gear meshing with the ring gear and having a supporting shaft rotatably supported on the spider and causing the spider to rotate, an input shaft provided with an input sun gear coupled to the planetary gear, an output shaft on the output side of the spider provided with an output gear, a gear on the output side fixed to a common rotatable shaft with a gear on the input side of the spider and coupled to the output gear, and an intermediate gear on the output side rotatably supported on the spider and coupling together the pair of gears on the output side such that the direction of rotation of the output gear due to direct gear drive is reversed and opposes the direction miposed by the spider.

2. A gear assembly comprising a supporting frame for containing the assembly, a spider assembly rotatably supported by the frame and dividing the structure into input and output sides, a ring gear fixed to the frame on the input side of the spider coaxial with the axis of spider rotation, a planetary gear meshing with the ring gear and having a supporting shaft rotatably supported on the spider and causing the spider to rotate, an input shaft provided with an input sun gear meshing with the planetary gear, an output shaft on the output side of the spider provided with an output gear, a gear on the output side fixed to a common rotatable shaft with the planetary gear on the input side, and an intermediate gear on the output side rotatably supported on the spider and meshing simultaneously wtih the gear fixed to the planetary gear and the output gear so that the direction of rotaion of he ouput gear due to direct gear drive is reversed and opposes the direction imposed by the spider.

3. A gear assembly comprising a supporting frame including a tubular housing for containing the assembly, a spider assembly rotatably supported by the frame and dividing the structure into input and output sides, a ring gear fixed to the frame on the input side of the spider coaxial with the axis of spider rotation, a planetary spur gear meshing with the ring gear and having a supporting shaft parallel to the axis of the ring gear and the spider rotatably supported on the spider and causing the spider to rotate, an input shaft provided with an input sun gear meshing with the planetary gear, an output shaft on the output side of the spider provided with an output spur gear on the output side, a spur gear fixed to a common rotatable shaft with the planetary gear on the input side, and an intermediate gear on the output side rotatably supported on the spider and meshing simultaneously with the gear fixed to the planetary gear and the output gear so that the direction of rotation of the output gear due to direct gear drive is reversed and opposes the direction imposed by the spider.

4. The gear assembly of claim 3 in which the housing is closed by end plates which provide bearing support for the input and output shafts respectively.

5. The gear assembly of claim 4 in which at least one of the shafts also obtains support through bearings from the spider.

6. The gear assembly of claim 3 in which the spider is provided with rolling bearings the outer race for which is press-fitted into the housing.

7. The gear assembly of claim 6 in which the spider is provided with rolling bearings the inner race for which is formed integrally with the spider.

8. A gear assembly comprising a supporting frame for containing the assembly, a spider assembly rotatably supported by the frame and dividing the structure into input and output sides, a ring gear fixed to the frame on the input side of the spider coaxial with the axis of spider rotation, a planetary gear meshing with the ring gear and having a supporting shaft rotatably supported on the spider and causing the spider to rotate, an input shaft provided with an input sun gear, an intermediate gear means rotatably supported on the spider and meshing simultaneously with the planetary gear and the input sun gear, an output shaft on the output side of the spider provided with an output gear, a gear fixed on the output side of the spider to the shaft of the intermediate gear means to rotate with the intermediate gear means and meshing with the output gear, whereby the intermediate gear means reverses the direction of rotation of the output gear due to direct gear drive so that it opposes the direction of rotation imposed by the spider.

9. A gear assembly comprising a supporting frame including a tubular housing for containing the assembly, a spider assembly rotatably supported by the frame and dividing the structure into input and output sides, a ring gear fixed to the frame on the input side of the spider coaxial with the axis of spider rotation, a planetary spur gear meshing with the ring gear and having a supporting shaft parallel to the axis of the ring gear and the spider rotatably supported on the spider and causing the spider to rotate, an input shaft provided with an input sun gear, an intermediate spur gear means rotatably supported on the spider and meshing simultaneously with the planetary gear and the input sun gear, an output shaft on the output side of the spider provided with an output gear, a spur gear fixed on the output side of the spider to the shaft of the intermediate gear means and meshing with the output gear, whereby the intermediate gear means reverses the direction of rotation of the output gear due to direct gear drive so that it opposes the direction of rotation imposed by the spider.

10. The gear assembly of claim 9 in which the housing is closed by end plates which provide bearing support for the input and output shafts respectively.

11. The gear assembly of claim 10 in which at least one of the shafts also obtains support through bearings from the spider.

12. The gear assembly of claim 9 in which the spider is provided with rolling bearings the outer race for which is press-fitted into the housing.

13. The gear assembly of claim 12 in which the spider is provided with rolling bearings the inner race for which is formed integrally with the spider.

14. The gear assembly of claim 1 in which the intermediate gear is a cluster gear.

15. The gear assembly of claim 3 in which the intermediate gear is a cluster gear.

16. The gear assembly of claim 9 in which the intermediate gear means is a cluster gear.

17. The gear assembly of claim 1 in which the planet gear is a cluster gear.

18. The gear assembly of claim 3 in which the planet gear is a cluster gear.

19. The gear assembly of claim 9 in which the planet gear is a cluster gear.

References Cited in the file of this patent

UNITED STATES PATENTS

| | | |
|---|---|---|
| 1,964,730 | Harris | July 3, 1934 |
| 2,189,776 | Bowen | Feb. 13, 1940 |

FOREIGN PATENTS

| | | |
|---|---|---|
| 877,247 | France | Sept. 1, 1942 |
| 1,075,133 | France | Apr. 14, 1954 |